United States Patent
Iwamura et al.

(10) Patent No.: US 8,249,595 B2
(45) Date of Patent: *Aug. 21, 2012

(54) CELL SELECTION METHOD AND MOBILE STATION

(75) Inventors: Mikio Iwamura, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/961,131

(22) Filed: Dec. 6, 2010

(65) Prior Publication Data

US 2011/0077045 A1 Mar. 31, 2011

Related U.S. Application Data

(63) Continuation of application No. 12/742,981, filed as application No. PCT/JP2008/070811 on Nov. 14, 2008.

(30) Foreign Application Priority Data

Nov. 16, 2007 (JP) ................................. 2007-298714
Sep. 22, 2008 (JP) ................................. 2008-243401

(51) Int. Cl.
*H04W 4/00* (2009.01)

(52) U.S. Cl. .................... 455/435.2; 455/435.3; 455/444

(58) Field of Classification Search .................. 455/3.01, 455/422.1, 434, 436–444, 550.1, 561, 562.1, 455/435.1–435.3; 370/328, 344

See application file for complete search history.

(56) References Cited

U.S. PATENT DOCUMENTS

| | | | |
|---|---|---|---|
| 5,499,386 A | 3/1996 | Karlsson | |
| 6,108,542 A * | 8/2000 | Swanchara et al. | 455/434 |
| 6,434,389 B1 * | 8/2002 | Meskanen et al. | 455/437 |
| 6,529,491 B1 | 3/2003 | Chang et al. | |
| 7,127,253 B2 * | 10/2006 | Chen | 455/449 |
| 7,145,890 B1 | 12/2006 | Seo et al. | |
| 7,519,365 B2 * | 4/2009 | Dorsey et al. | 455/435.1 |
| 2003/0040311 A1 * | 2/2003 | Choi | 455/434 |
| 2003/0148774 A1 * | 8/2003 | Naghian et al. | 455/456 |
| 2004/0162074 A1 * | 8/2004 | Chen | 455/437 |
| 2005/0037798 A1 * | 2/2005 | Yamashita et al. | 455/525 |
| 2005/0148349 A1 * | 7/2005 | Putcha et al. | 455/458 |
| 2006/0160541 A1 | 7/2006 | Ryu | |
| 2008/0293419 A1 | 11/2008 | Somasundaram et al. | |
| 2008/0318576 A1 | 12/2008 | So et al. | |

(Continued)

FOREIGN PATENT DOCUMENTS

GB 2315193 A 1/1998

(Continued)

OTHER PUBLICATIONS

3GPP TS 25.304 V7.3.0, Sep. 2007, User Equipment (UE) Procedures in Idle Mode and Procedures for Cell Reselection in Connected Mode, 42 pages.

(Continued)

*Primary Examiner* — Dominic E Rego

(74) *Attorney, Agent, or Firm* — Osha • Liang LLP

(57) ABSTRACT

A cell selection method includes steps of: (A) determining, at a mobile station (UE), whether or not a first CSG cell satisfies a predetermined condition, when using a first macro cell as a camped cell; and (B) changing, at the mobile station (UE), the camped cell from the first macro cell to a first CSG cell, when determined that the first CSG cell satisfies the predetermined condition.

4 Claims, 6 Drawing Sheets

U.S. PATENT DOCUMENTS

2009/0036127 A1* 2/2009 Kim .................... 455/435.2
2009/0067386 A1* 3/2009 Kitazoe .................. 370/332

FOREIGN PATENT DOCUMENTS

| JP | 8-501430 T | 2/1996 |
|---|---|---|
| KR | 20010017137 A | 3/2001 |
| KR | 10-0352040 B1 | 8/2002 |
| WO | 95/02309 A1 | 1/1995 |

OTHER PUBLICATIONS

3GPP TSG-RAN WG2 Meeting #58bis; R2-072386; R2-071727, Jun. 25-29, 2007, "E-UTRA Measurements and Cell Reselection Considerations", 6 pages.

Extended European Search Report for Application No. 08849350.7 dated May 9, 2011 (8 pages).

Extended European Search Report for Application No. 10194507.9 dated Apr. 19, 2011 (8 pages).

Extended European Search Report for Application No. 10194508.7 dated Apr. 19, 2011 (8 pages).

Extended European Search Report for Application No. 10194506.1 dated Apr. 19, 2011 (8 pages).

Notice of Reason(s) for Refusal for Japanese Patent Application No. 2009-209831 dated Oct. 26, 2010, with English translation thereof (4 pages).

Notice of Reason(s) for Refusal for Japanese Patent Application No. 2009-209825 dated Oct. 26, 2010, with English translation thereof (4 pages).

Office Action for U.S. Appl. No. 12/961,205 mailed Sep. 21, 2011 (12 pages).

Office Action in Japanese Patent Application No. 2009-209828 mailed Nov. 2, 2010, with English translation thereof (4 pages).

Office Action for Korean Application No. 2010-7027302 dated Dec. 21, 2011, with English translation thereof (5 pages).

Office Action for Korean Application No. 2010-7027312 dated Dec. 21, 2011, with English translation thereof (5 pages).

Office Action for Korean Application No. 2010-7027319 dated Dec. 21, 2011, with English translation thereof (5 pages).

Office Action for Korean Application No. 2010-7027325 dated Dec. 21, 2011, with English translation thereof (5 pages).

Korean Patent Abstract for Publication No. 2001-0017137 Published Mar. 5, 2001 (1 page).

Korean Abstract for Registration No. 10-0352040 Registration dated Aug. 27, 2002 (1 page).

Office Action for U.S. Appl. No. 12/742,981 mailed Oct. 19, 2011 (8 pages).

Office Action for U.S. Appl. No. 12/961,147 mailed Oct. 27, 2011 (11 pages).

Office Action for U.S. Appl. No. 12/961,190 mailed Nov. 1, 2011 (10 pages).

Office Action for U.S. Appl. No. 12/961,131 mailed Oct. 31, 2011 (10 pages).

Office Action in Australian Patent Application No. 2008321774 mailed Nov. 8, 2011 (2 pages).

Office Action in Australian Patent Application No. 2011201534 mailed Nov. 3, 2011 (2 pages).

Office Action in Australian Patent Application No. 2011201531 mailed Nov. 3, 2011 (2 pages).

Office Action in Australian Patent Application No. 2011201532 mailed Nov. 3, 2011 (2 pages).

* cited by examiner

CELL SELECTION METHOD AND MOBILE STATION

CROSS-REFERENCE TO RELATED APPLICATIONS

This is a continuation application of U.S. patent application Ser. No. 12/742,981 filed Jun. 14, 2010, which is a national stage application of PCT/JP2008/070811, filed Nov. 14, 2008, which claims priority to JP2007-298714 and JP2008-243401.

TECHNICAL FIELD

The present invention relates to a cell selection method in which a mobile station selects a camped cell among specific cells selectable as a camped cell only by a specific mobile station and general cells selectable as a camped cell by any mobile station. The present invention also relates to the mobile station.

BACKGROUND ART

There is a discussion in the 3GPP (3rd Generation Partnership Project) RAN-WG on a home base station HNB employing the "LTE (Long Term Evolution)" as a radio access scheme.

Specifically, in the current 3GPP specifications, a mobile communication system is configured to manage a specific mobile station (a mobile station permitted to select a specific cell as a camped cell) belonging to a CSG (Closed Subscriber Group) under control of the home base station HNB.

In other words, in the current 3GPP specifications, only a specific mobile station belonging to a CSG can perform communication via a CSG cell (specific cell) under control of the home base station HNB.

However, the current 3GPP specifications do not define a method in which the mobile station selects a camped cell in an environment where CSG cells and macro cells coexist.

Accordingly, the following situation may occur. Specifically, even when a mobile station using a macro cell as a camped cell enters an area where a CSG cell regarding the mobile station as a specific mobile station is selectable as a camped cell, the mobile station cannot detect that, and thus cannot change the camped cell to the CSG cell.

The present invention has been made in consideration of the above problem, and has an objective to provide a cell selection method and a mobile station that allow a camped cell to be properly selected in an environment where CSG cells and macro cells coexist.

DISCLOSURE OF THE INVENTION

A first aspect of the present invention is summarized as a cell selection method in which a mobile station selects a camped cell among a specific cell selectable as a camped cell only by a specific mobile station and a general cell selectable as a camped cell by any mobile station, the cell selection method including steps of: (A) determining, at the mobile station, whether or not a predetermined condition is satisfied, when using a first general cell as the camped cell; and (B) changing, at the mobile station, the camped cell from the first general cell to a first specific cell, when determined that the predetermined condition is satisfied.

In the first aspect, in the step (A), the mobile station can determine whether or not the predetermined condition is satisfied, when using the first general cell as the camped cell, and when determined that the mobile station is located in the general cell which at least partially overlaps the first specific cell that regards the mobile station as the specific mobile station.

In the first aspect, a first frequency used by the first specific cell can be different from a second frequency used by the first general cell; and when determined that the first specific cell has best radio quality among cells using the first frequency, and when determined that the radio quality in the first specific cell satisfies first radio quality, the mobile station can determine that the predetermined condition is satisfied, in the step (A), and can change the camped cell from the first general cell to the first specific cell, in the step (B).

In the first aspect, a first frequency used by the first specific cell can be different from a second frequency used by the first general cell; and when determined that a difference between radio quality in the first specific cell and best radio quality among cells using the first frequency is within a predetermined offset, and determined that the radio quality in the first specific cell satisfies first radio quality, the mobile station can determine that the predetermined condition is satisfied, in the step (A), and can change the camped cell from the first general cell to the first specific cell, in the step (B).

In the first aspect, when determined that radio quality in the first specific cell satisfies first radio quality, the mobile station can determine that the predetermined condition is satisfied, in the step (A), and can change the camped cell from the first general cell to the first specific cell, in the step (B).

In the first aspect, the cell selection method can further include a step of (C) setting, at the mobile station, a second specific cell as the camped cell, when not detected a general cell that satisfies second radio quality, and when detected the second specific cell that does not regard the mobile station as the specific mobile station and satisfies third radio quality.

In the first aspect, the cell selection method can further include a step of: changing, at the mobile station, the camped cell from the second specific cell to a second general cell, when using the second specific cell as the camped cell, and when detected a second general cell that satisfies the second radio quality.

A second aspect of the present invention is summarized as a mobile station configured to select a camped cell among a specific cell selectable as a camped cell only by a specific mobile station and a general cell selectable as a camped cell by any mobile station, the mobile station including: a cell selector unit configured to determine whether or not a predetermined condition is satisfied when using a first general cell as a camped cell, and to change the camped cell from the first general cell to a first specific cell when determined that the predetermined condition is satisfied.

In the second aspect, the cell selector unit can be configured to determine whether or not the predetermined condition is satisfied, when using the first general cell as the camped cell, and when determined that the mobile station is located in the general cell which at least partially overlaps the first specific cell that regards the mobile station as the specific mobile station.

In the second aspect, a first frequency used by the first specific cell can be different from a second frequency used by the first general cell; and when determined that the first specific cell has best radio quality among cells using the first frequency, and that the radio quality in the first specific cell satisfies first radio quality, the cell selector unit can be configured to determine that the predetermined condition is satisfied, and to change the camped cell from the first general cell to the first specific cell.

In the second aspect, a first frequency used by the first specific cell can be different from a second frequency used by the first general cell; and when determined that a difference between radio quality in the first specific cell and best radio quality among cells using the first frequency is within a predetermined offset, and determined that the radio quality in the first specific cell satisfies first radio quality, the cell selector unit can be configured to determine that the predetermined condition is satisfied, and to change the camped cell from the first general cell to the first specific cell.

In the second aspect, when determined that radio quality in the first specific cell satisfies first radio quality, the cell selector unit can be configured to determine that the predetermined condition is satisfied, and to change the camped cell from the first general cell to the first specific cell.

In the second aspect, when not detected a general cell that satisfies second radio quality, and when detected a second specific cell that does not regard the mobile station as the specific mobile station and satisfies third radio quality, the cell selector unit can be configured to set the second specific cell as the camped cell.

In the second aspect, when using the second specific cell as the camped cell, and when detected a second general cell that satisfies the second radio quality, the cell selector unit can be configured to change the camped cell from the second specific cell to the second general cell.

A third aspect of the present invention is summarized as a cell selection method in which a mobile station selects a camped cell among a first cell using a first frequency and a second cell using a second frequency different from the first frequency, the cell selection method including a step of: changing, at the mobile station which uses the first cell as the camped cell, the camped cell from the first cell to the second cell, when a priority level of the second cell is higher than a priority level of the first cell, and when determined that radio quality in the second cell satisfies predetermined radio quality.

A fourth aspect of the present invention is summarized as a cell selection method in which a mobile station selects a camped cell among a first cell using a first frequency and a second cell using a second frequency different from the first frequency, the cell selection method including a step of: changing, at the mobile station which uses the first cell as the camped cell, the camped cell from the first cell to the second cell, when a priority level of the second cell is the same as a priority level of the first cell, and when determined that radio quality in the second cell satisfies predetermined radio quality and that radio quality in the first cell does not satisfy predetermined radio quality.

A fifth aspect of the present invention is summarized as a cell selection method in which a mobile station selects a camped cell among a first cell using a first frequency and a second cell using a second frequency different from the first frequency, the cell selection method including a step of: changing, at the mobile station which uses the first cell as the camped cell, the camped cell from the first cell to the second cell, when a priority level of the second cell is lower than a priority level of the first cell, and when determined that radio quality in the second cell satisfies predetermined radio quality and that radio quality in the first cell does not satisfy predetermined radio quality.

In the third to fifth aspects, the mobile station can change the camped cell from the first cell to the second cell, when the second cell is a specific cell selectable as a camped cell only by a specific mobile station, and when determined that a difference between radio quality in the second cell and best radio quality among cells using the second frequency is within a predetermined offset.

A sixth aspect of the present invention is summarized as a mobile station configured to select a camped cell among a first cell using a first frequency and a second cell using a second frequency different from the first frequency, the mobile station including: a cell selector unit configured to change the camped cell from the first cell to the second cell, when a priority level of the second cell is higher than a priority level of the first cell, when the first cell is used as the camped cell, and when determined that radio quality in the second cell satisfies predetermined radio quality.

A seventh aspect of the present invention is summarized as a mobile station configured to select a camped cell among a first cell using a first frequency and a second cell using a second frequency different from the first frequency, the mobile station including: a cell selector unit configured to change the camped cell from the first cell to the second cell, when a priority level of the second cell is the same as a priority level of the first cell, when the first cell is used as the camped cell, and when determined that radio quality in the second cell satisfies predetermined radio quality and that radio quality in the first cell does not meet predetermined radio quality.

A eighth aspect of the present invention is summarized as a mobile station configured to select a camped cell among a first cell using a first frequency and a second cell using a second frequency different from the first frequency, the mobile station including: a cell selector unit configured to change the camped cell from the first cell to the second cell, when a priority level of the second cell is lower than a priority level of the first cell, when the first cell is used as the camped cell, and when determined that radio quality in the second cell satisfies predetermined radio quality and that radio quality in the first cell does not meet predetermined radio quality.

In the sixth to eighth aspects, the cell selector unit can be configured to change the camped cell from the first cell to the second cell, when the second cell is a specific cell selectable as a camped cell only by a specific mobile station, and when determined that a difference between radio quality in the second cell and best radio quality among cells using the second frequency is within a predetermined offset.

BEST MODE FOR CARRYING OUT THE INVENTION

Configuration of a Mobile Communication System According to a First Embodiment of the Present Invention Referring to FIGS. 1 to 3, the configuration of a mobile communication system according to a first embodiment of the present invention will be described.

Figure 1:
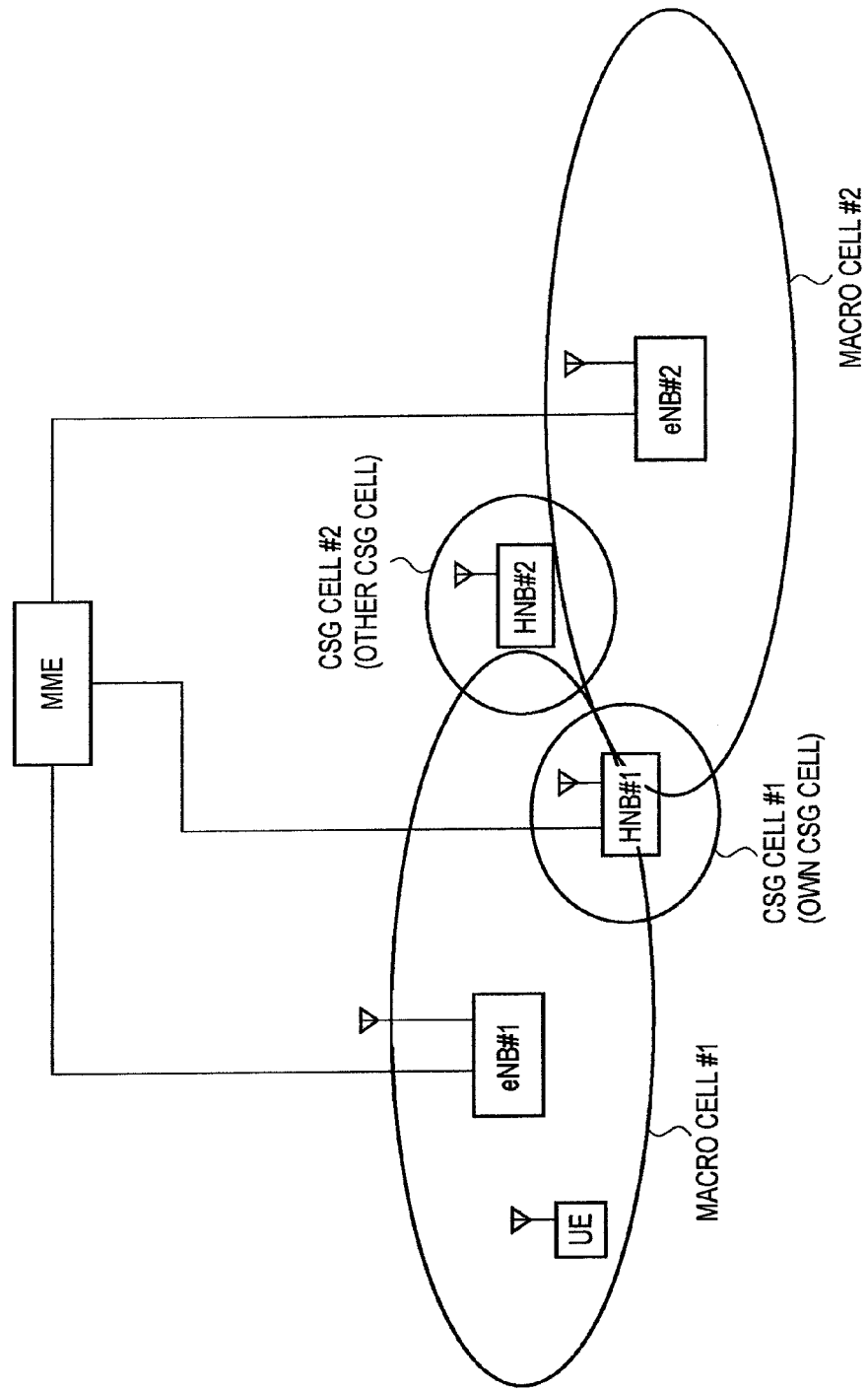
FIG. 1 is a diagram showing the overall configuration a mobile communication system according to a first embodiment of the present invention.

As FIG. 1 shows, the mobile communication system according to the embodiment includes: a switching apparatus MME (Mobility Management Entity); home base stations HNB #1 and #2 that manage CSG cells (specific cells) #1 and #2, respectively; radio base stations eNB #1 and #2 that manage macro cells (general cells) #1 and #2, respectively; and a mobile station UE.

Here, the CSG cell is a cell for which a CSG is set up, whereas the macro cell is a cell for which no CSG is set up. The CSG is a group having an access right to a set-up CSG cell.

When not belonging to a CSG setup for a certain CSG cell, the mobile station UE is a "general mobile station" in that certain CSG cell. When belonging to a CSG setup for a certain CSG cell, on the other hand, the mobile station UE is a "specific mobile station" in that certain CSG cell.

In the mobile communication system according to the embodiment, the CSG cell #1 regards the mobile station UE as a "specific mobile station" (a mobile station permitted to use the CSG cell #1 as a camped cell, namely, a mobile station permitted to perform communication via the CSG cell #1). On the other hand, the CSG cell #2 does not regard the mobile station UE as a "specific mobile station". Accordingly, to the mobile station UE, the CSG cell #1 is an "own CSG cell", and the CSG cell #2 is an "other CSG cell".

In addition, in the example shown in FIG. 1, the CSG cell #1 partially overlaps the macro cells #1 and #2, and the CSG cell #2 also partially overlaps the macro cells #1 and #2.

Note that the CSG can be set up not only for a cell under control of a so-called home base station installed in houses, but also for a general cell under control of a radio base station installed in office buildings, cafes, schools, and elsewhere. For example, possible situations include giving an access right only to the employees of an office, or giving an access right temporarily to the employees and customers of a cafe.

In such cases, the same CSG may be set up for multiple cells or multiple radio base stations. The radio base stations are ranged from small-sized low-power ones to large-sized high-power ones.

Accordingly, in the description herein, the above scenarios are encompassed, and a radio base station managing a cell for which a CSG is set up (CSG cell) is specially called a "home base station HNB" for convenience reasons.

The switching apparatus MME is configured to manage specific mobile stations in CSG cells under control of the home base stations HNB connected to the switching apparatus MME (namely, configured to manage specific mobile stations permitted to perform communication via the CSG cells).

Alternatively, it may be the home base station HNB that is configured to manage a specific mobile station in a cell under control of the home base station HNB. However, the home base station HNB can be installed where the user can reach. Accordingly, considering factors such as security, it is preferable that the switching apparatus MME be configured to manage specific mobile stations in CSG cells as described above.

Figure 2:
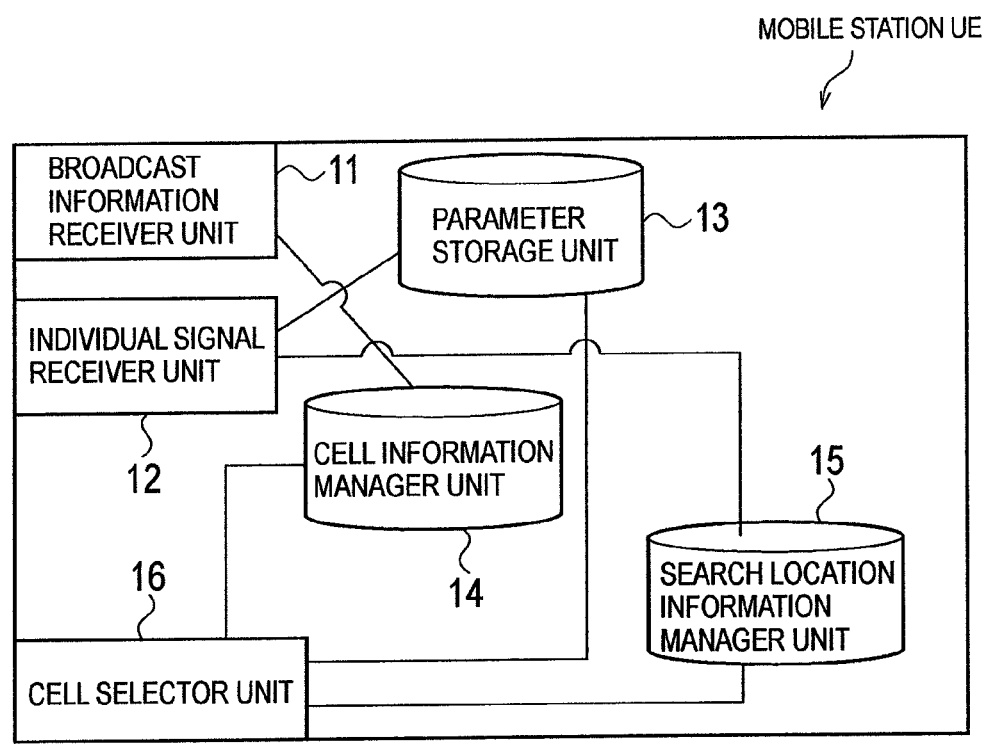
FIG. 2 is a functional block diagram of a mobile station according to the first embodiment of the present invention.

As FIG. 2 shows, the mobile station UE has a broadcast information receiver unit 11, an individual signal receiver unit 12, a parameter storage unit 13, a cell information manager unit 14, a search location information manager unit 15, and a cell selector unit 16.

The broadcast information receiver unit 11 is configured to receive broadcast information transmitted via a BCH (Broadcast Channel), an SU (Scheduling Unit) or the like, from the radio base station eNB or the home base station HNB managing the camped cell (a CSG cell or a macro cell) of the mobile station UE.

For example, The broadcast information receiver unit 11 is configured to receive, as the broadcast information, information identifying a cell (or a TA: Tracking Area) where the mobile station UE is currently located (a cell ID and a TA-ID).

The broadcast information receiver unit 11 is configured to also receive, as the broadcast information, information on the frequency of a cell that at least partially overlaps the cell (a CSG cell or a macro cell) where the mobile station UE is currently located (different-frequency information).

Here, in a case where the mobile station UE is located in a cell F2 having a frequency f2, the broadcast information receiver unit 11 is configured to receive, as the "different-frequency information", information (a TA-ID and a cell ID) identifying each of cells F1, F3, and F4 that overlaps the cell F2 at least partially; frequencies f1, f3, and f4 (e.g., xxMHz) used by the respective cells F1, F3, and F4 overlapping the cell F2 at least partially; and the like.

The individual signal receiver unit 12 is configured to receive an individual signal transmitted from the switching apparatus MME.

For example, the individual signal receiver unit 12 is configured to receive, as the individual signal, a "list of own CSG cells," a "list of overlapping macro cells" and the like. The "list of own CSG cells" lists CSG cells for which the CSG to which the mobile station UE belongs is set up. For each of the own CSG cells, the "list of overlapping macro cells" lists macro cells that overlap the CSG cell at least partially.

Here, the individual signal receiver unit 12 may be configured to receive, as the individual signal, the above-described "list of own CSG cells", "list of overlapping macro cells" and the like, upon entrance to a macro cell (or a TA) overlapping an own CSG cell of the mobile station UE at least partially.

The parameter storage unit 13 is configured to store parameters, such as "Hysteresis (e.g., xx dB)", "Treselection (e.g., xx seconds)" and "Margin (e.g., xx dB)" included in determination information used for determining whether or not to change the camped cell of the mobile station UE.

Each of these parameters may be a different value for each cell, or be a common value for multiple cells. In addition, these parameters may be notified of as the aforementioned broadcast information or as the aforementioned individual signal.

The cell information manager unit 14 is configured to manage information on each cell (cell information).

The cell information manager unit 14 is configured to manage, as the cell information, a "priority level", a threshold "QRSRPmin" or "QRSRQmin", a "frequency used", a predetermined offset "OffsetRSRP" or "OffsetRSRQ" and the like, for each cell.

Note that the threshold "QRSRPmin" or "QRSRQmin" and the predetermined offset "OffsetRSRP" or "OffsetRSRQ" may be a different value for each cell, or be a common value for multiple cells.

Moreover, the threshold "QRSRPmin" and "QRSRQmin" may be called "ThreshServing, low", "ThreshX, low", "ThreshX, high" and the like.

Each information element included in the cell information may be notified of as the aforementioned broadcast information or as the aforementioned individual signal.

Figure 3:
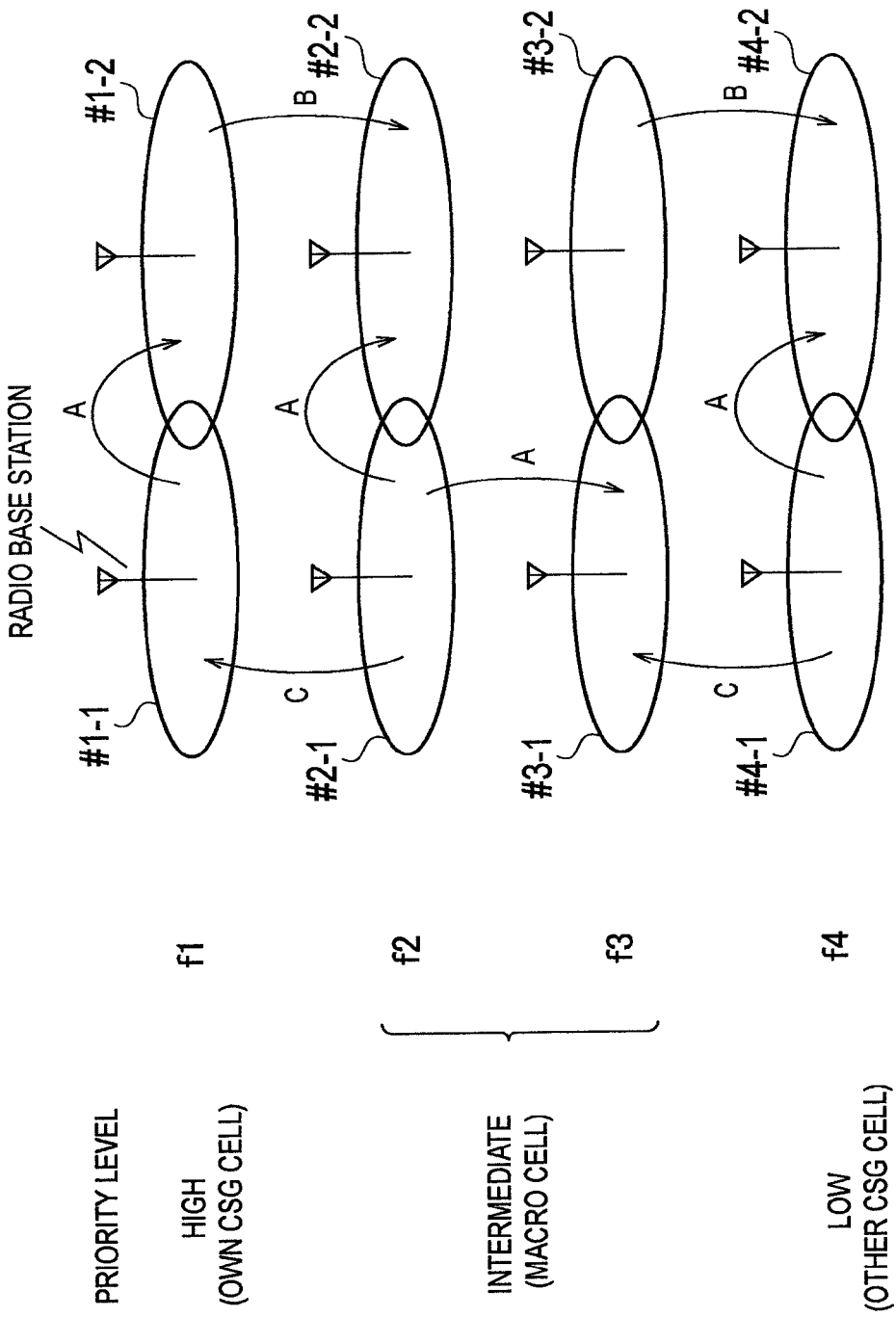
FIG. 3 is a diagram illustrating an operation of determining a camped cell of the mobile station, according to the first embodiment of the present invention.

In the example shown in FIG. 3, the "own CSG cells" of the mobile station UE each have a "high" priority level; "macro cells" each have an "intermediate" priority level; and the "other CSG cells" of the mobile station UE each have a "low" priority level. Note that the carrier frequency of the "own CSG cells" and the carrier frequency of the "other CSG cells" may be different or the same.

The search location information manager unit 15 is configured to manage search location information defining a location where the mobile station UE should start searching for the own CSG cell.

For example, the search location information manager unit 14 may be configured to directly manage, as the search location information, the "list of own CSG cells" and the "list of overlapping macro cells" received by the individual signal receiver unit 12. In this case, the "search location" is the macro cells included in the "list of overlapping macro cells".

Alternatively, the search location information manager unit 15 may be configured to manage search location information (Finger Print) uniquely generated based on the "list of own CSG cells" and the "list of overlapping macro cells" received by the individual signal receiver unit 12. In this case, the "search location" is a location defined by "GPS information" or the like.

Furthermore, the search location information manager unit 15 may be configured to manage search location information generated based on the propagation levels or the like of cells included in the "list of overlapping macro cells".

The cell selector unit 16 is configured to select a camped cell (a cell where the mobile station UE should camp on) among CSG cells (specific cells selectable as a camped cell only by specific mobile stations) and macro cells (general cells selectable as a camped cell by any mobile stations).

As FIG. 3 shows, the cell selector unit 16 is configured to select the camped cell based on the priority level of each cell.

In the example shown in FIG. 3, regarding to the mobile station UE, cells #1-1 and #1-2 (own CSG cells) using the frequency f1 each have a "high" priority level; cells #2-1, #2-2, #3-1, and #3-2 (macro cells) using either the frequency f2 or the frequency f3 each have an "intermediate" priority level; and cells #4-1 and #4-2 (other CSG cells) using the frequency f4 each have a "low" priority level. Note that the frequencies f1 and f4 may be different frequencies, or be the same frequency.

Here, the cell selector unit 16 is configured to perform a search, at a predetermined interval "TEqual", whether or not there is any cell selectable as a camped cell for the mobile station UE among the cells having the same priority level as the current camped cell of the mobile station UE.

Note that the cell selector unit 16 may be configured not to perform the search, when the radio quality "Serving (RSRQ (Reference Signal Received Quality) or RSRP (Reference Signal Received Power))" in the current camped cell of the mobile station UE is a threshold "SsearchEqual" or more.

For example, as FIG. 3 shows, when using the "cell #1-1" which uses the frequency f1 and has a "high" priority level, as the camped cell, and when a predetermined condition A (R-criteria) is satisfied, the cell selector unit 16 is configured to change the camped cell from the "cell #1-1" to the "cell #1-2" using the frequency f1 and having a "high" priority level.

Figure 5:
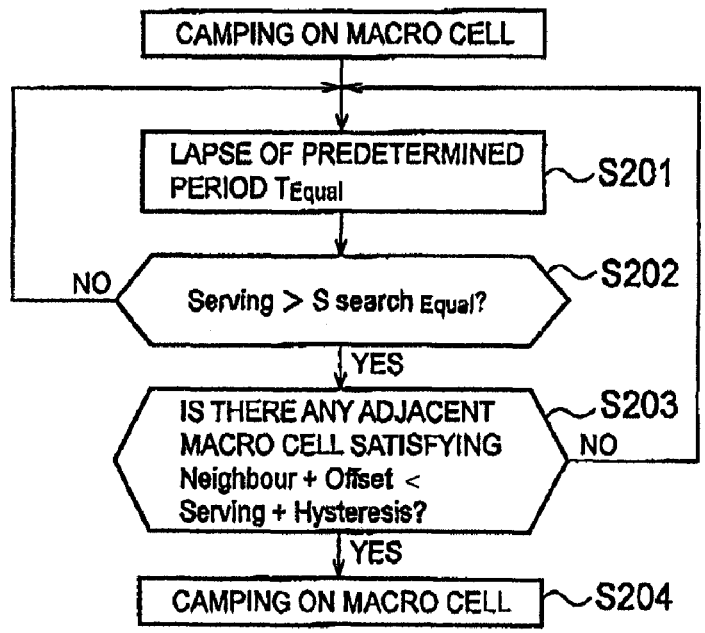
FIG. 5 is a flowchart showing an operation of determining a camped cell of the mobile station, according to the first embodiment of the present invention.

In addition, as FIG. 3 shows, when using the "cell #2-1" which uses the frequency f2 and has an "intermediate" priority level, as the camped cell, and when the predetermined condition A is satisfied, the cell selector unit 16 is configured to change the camped cell from the "cell #2-1" to either the "cell #2-2" using the frequency f2 and having an "intermediate" priority level or the "cell #3-1" using the frequency f3 and having an "intermediate" priority level (see the operation shown in FIG. 5 described later).

Moreover, as FIG. 3 shows, when using the "cell #4-1" which uses the frequency f4 and has a "low" priority level, as the camped cell, and when the predetermined condition A is satisfied, the cell selector 16 is configured to change the camped cell from the "cell #4-1" to the "cell #4-2" using the frequency f4 and having a "low" priority level.

Here, the cell selector unit 16 is configured to determine that the predetermined condition A is satisfied when the following Equation (1) holds true.

$$\text{"Neighbour"} + \text{"OffsetRSRP (or Offset RSRQ)"} > \text{"Serving"} + \text{"Hysteresis"} \quad \text{Equation (1)}$$

Here, "Neighbour" is the radio quality in a cell adjacent to the current camped cell of the mobile station UE (the "cell #1-2", the "cell #2-2", the "cell #3-1" or the "cell #4-2"); "OffsetRSRP (or Offset RSRQ)" is a predetermined offset; "Serving" is the radio quality in the current camped cell of the mobile station UE (the "cell #1-1", the "cell #2-1" or the "cell #4-1"); and "Hysteresis" is a predetermined parameter.

Meanwhile, as FIG. 3 shows, when using the "cell #1-2" as the camped cell, and when a predetermined condition B is satisfied, for example, the cell selector unit 16 is configured to change the camped cell from the "cell #1-2" to the "cell #2-2".

Moreover, when using the "cell #3-2" as the camped cell, and when the predetermined condition B is satisfied, the cell selector unit 16 is configured to change the camped cell from the "cell #3-2" to the "cell #4-2" (see the operation shown in FIG. 6 described later).

Here, the cell selector unit 16 is configured to determine that the predetermined condition B is satisfied, when not detected a cell that satisfies second radio quality (namely, a cell in which (radio quality "RSRP" or "RSRQ")<("QRSRPmin" or "QRSRQmin")+(parameter "Margin") holds true) among the cells having the same priority level as the current camped cell of the mobile station UE; and when detected a cell that has a lower priority level than the current camped cell of the mobile station UE and satisfies third radio quality (namely, a cell in which (radio quality "RSRP" or "RSRQ")>("QRSRPmin" or "QRSRQmin")+(parameter "Hysteresis") holds true).

Here, the cell selector unit 16 is configured to perform a search, at a predetermined interval "THigher", whether or not there is any cell selectable as a camped cell for the mobile station UE among the cells having a higher priority level than the current camped cell of the mobile station UE.

Here, the mobile station UE may be notified of the predetermined intervals "TEqual" and "THigher" through the broadcast information and the individual signal described above. Note that the predetermined intervals "TEqual" and "THigher" may be the same interval or be different intervals.

For example, as FIG. 3 shows, when using the "cell #4-1" as the camped cell, and when a predetermined condition C is satisfied, the cell selector unit 16 is configured to change the camped cell from the "cell #4-1" to the "cell #3-1".

Figure 4:
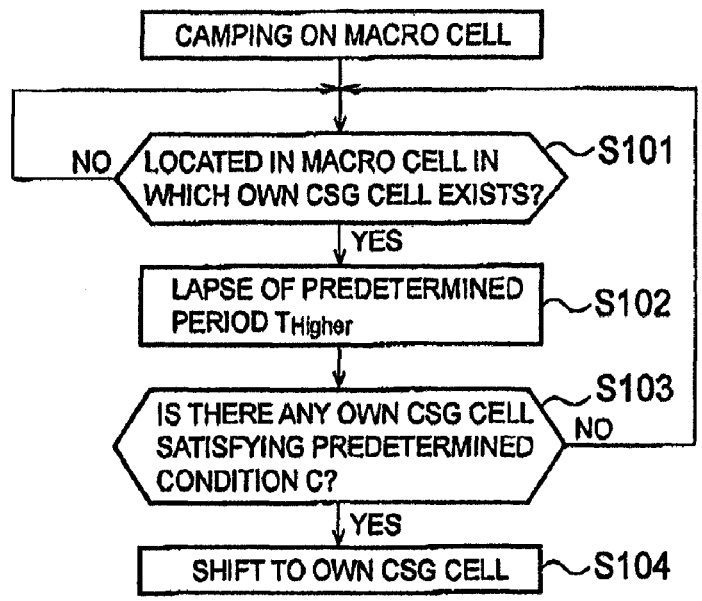
FIG. 4 is a flowchart showing an operation of determining a camped cell of the mobile station, according to the first embodiment of the present invention.

Moreover, as FIG. 3 shows, the cell selector unit 16 is configured to change the camped cell from the "cell #2-1" to the "cell #1-1", when using the "cell #2-1" as the camped cell; when the mobile station UE is determined as being located in the "cell #2-1 (a general cell)" that at least partially overlaps the "cell #1-1 (a first specific cell that regards the mobile station UE as a "specific mobile station")"; and when the predetermined condition C is satisfied (see the operation shown in FIG. 4 described later).

Here, the cell selector unit 16 may be configured to determine that the predetermined condition C is satisfied, when determining that the "cell #1-1 (the first specific cell) has the best "RSRP or RSRQ (radio quality)" among the cells using the frequency f1 (first frequency); and when determining that the "RSRP or RSRQ (radio quality)" of the "cell #1-1 (first specific cell)" satisfies first radio quality (namely, when (radio quality "RSRP" or "RSRQ")>("QRSRPmin" or "QRSRQmin") holds true).

Alternatively, the cell selector unit 16 may be configured to determine that the predetermined condition C is satisfied, when determining that the difference between the "RSRP or RSRQ (radio quality)" of the "cell #1-1 (first specific cell)" and the best "RSRP or RSRQ (radio quality)" among the cells using the frequency f1 (first frequency) is within the predetermined offset "OffsetRSRP or OffsetRSRQ; and when determining that the "RSRP or RSRQ (radio quality)" of the "cell #1-1 (first specific cell)" satisfies the first radio quality (namely, when (radio quality "RSRP" or "RSRQ")> ("QRSRPmin" or "QRSRQmin") holds true).

Still alternatively, the cell selector unit 16 may be configured to determine that the predetermined condition C is satisfied, when determining that the "RSRP or RSRQ (radio quality)" of the "cell #1-1 (first specific cell)" satisfies the first radio quality (namely, when (radio quality "RSRP" or "RSRQ")>("QRSRPmin" or "QRSRQmin") holds true).

(Operation of the Mobile Communication System According to the First Embodiment of the Present Invention)

Figure 6:
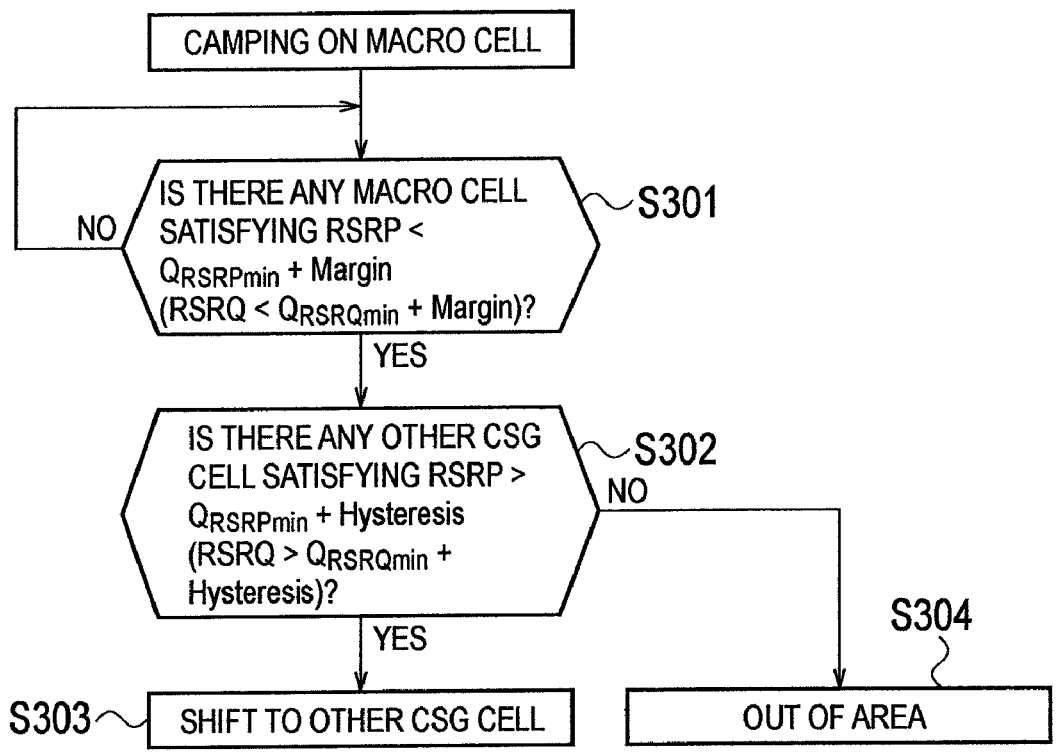
FIG. 6 is a flowchart showing an operation of determining a camped cell of the mobile station, according to the first embodiment of the present invention.

Referring to FIGS. 4 to 6, an operation of the mobile communication system according to the first embodiment of the present invention will be described.

First, with reference to FIG. 4, a description will be given of an operation in which the mobile station UE changes a camped cell from a "macro cell" to an "own CSG cell".

As FIG. 4 shows, in Step S101, upon receipt of the "list of own CSG cells" and the "list of overlapping macro cells" from the switching apparatus MME, the mobile station UE determines whether or not the "information identifying a macro cell (a TA-ID and a cell ID)" having been notified of through the broadcast information is in the "list of overlapping macro cells" included in the individual signal received from the switching apparatus MME. Thereby, the mobile station UE determines whether or not the mobile station UE is located in the macro cell which overlaps an own CSG cell at least partially.

Alternatively, in Step S101, the mobile station UE determines whether or not the mobile station UE is located within a "search location" by referring to the search location information manager unit 15. Thereby, the mobile station UE determines whether or not the mobile station UE is located in the macro cell which overlaps an own CSG cell at least partially.

When determined as being not located in such a macro cell, the mobile station UE repeats the processing in Step S101.

When determined as being located in such a macro cell, and when detected a lapse of the predetermined period "THigher" in Step S102, the mobile station UE determines whether or not there is an own CSG cell satisfying the predetermined condition C.

When determined that there is an own CSG cell satisfying a predetermined condition C, in Step S104, the mobile station UE changes the camped cell to the own CSG cell satisfying the predetermined condition C.

On the other hand, when the mobile station UE determines that there is no own CSG cell satisfying the predetermined condition C, the operation returns to Step S101.

Second, with reference to FIG. 5, a description will be given of an operation in which the mobile station UE changes a camped cell from a "first macro cell" to a "second macro cell".

As FIG. 5 shows, when detected a lapse of the predetermined period "TEqual" in Step S201, the mobile station UE determines whether or not the radio quality "Serving (RSRP or RSRQ)" is larger than the threshold "SSearchEqual" in Step S202.

When the determination result in Step S202 is negative (NO), the operation returns to Step S201.

On the other hand, when the determination result in Step S202 is affirmative (YES), the mobile station UE determines whether or not the following Equation (2) holds true in Step S203.

("Neighbour (RSRP or RSRQ)" being the radio quality in the second macro cell adjacent to the first macro cell)+(predetermined offset "OffsetRSRP" or "OffsetRSRQ")<("Serving (RSRP or RSRQ)" being the radio quality in the first macro cell)+ (parameter "Hysteresis")     Equation (2)

When the determination result in Step S203 is negative (NO), the operation returns to Step S201.

On the other hand, when the determination result in Step S203 is affirmative (YES), the mobile station UE changes the camped cell from the "first macro cell" to the "second macro cell".

Third, with reference to FIG. 6, a description will be given of an operation in which the mobile station UE changes a camped cell from a "macro cell" to an "other CSG cell".

In Step S301, the mobile station UE determines whether or not the mobile station UE detects a cell in which (radio quality "RSRP" or "RSRQ")<(QRSRPmin" or "QRSRQmin")+(parameter "Margin") holds true.

When the determination result in Step S301 is negative (NO), the operation returns to Step S301.

On the other hand, when the determination result in Step S301 is affirmative (YES), the mobile station UE determines whether or not the mobile station UE detects a cell in which (radio quality "RSRP" or "RSRQ")>("QRSRPmin" or "QRSRQmin")+(parameter "Hysteresis") holds true in Step S302.

When the determination result in Step S302 is negative (NO), the mobile station UE detects as being out of area in Step S304.

On the other hand, when the determination result in Step S302 is affirmative (YES), the mobile station UE selects the cell (other CSG cell) detected in Step S302 as the camped cell, in Step S303.

(Advantageous Effects of the Mobile Communication System According to the First Embodiment of the Present Invention)

With the mobile communication system according to the embodiment, a camped cell can be selected properly in an environment where CSG cells and macro cells coexist.

(Modification 1)

Figure 7:
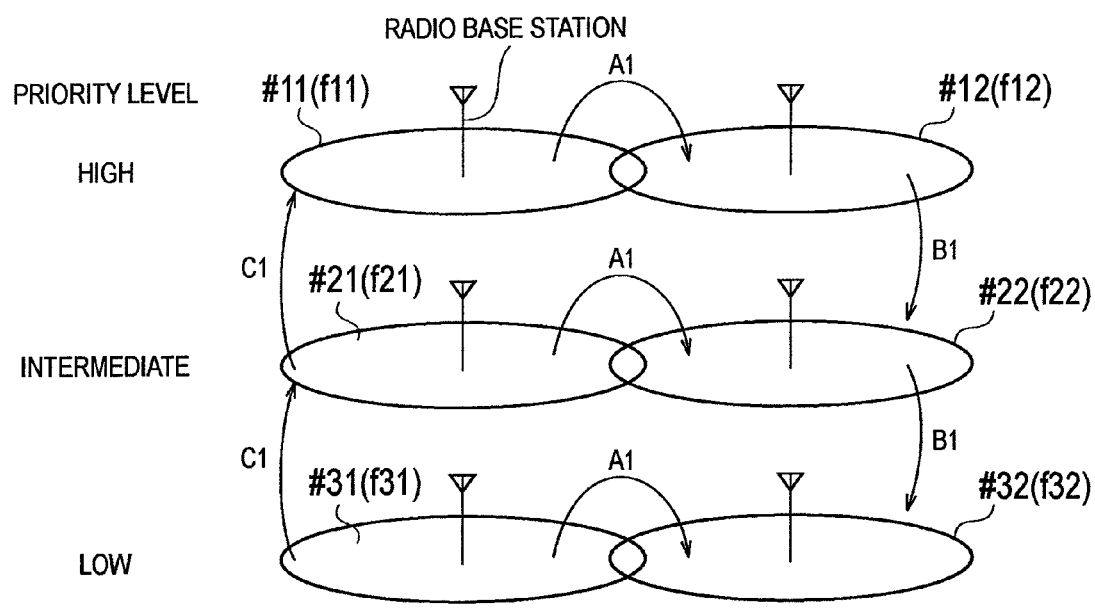
FIG. 7 is a diagram illustrating a mobile communication system according to Modification 1 of the present invention.

Referring to FIG. 7, a mobile communication system according to Modification 1 will be described, focusing on differences from the mobile communication system according to the first embodiment described above.

In the example shown in FIG. 7, regarding to the mobile station UE, a cell #11 using a frequency f11 and a cell #12 using a frequency f12 each have a "high" priority level; a cell #21 using a frequency f21 and a cell #22 using a frequency f22 each have an "intermediate" priority level; and a cell #31 using a frequency f31 and a cell #32 using a frequency f32 each have a "low" priority level. Note that the cells #11, #12, #21, #22, #31, and #32 may be a macro cell or be a CSG cell. In addition, the frequencies f11, f12, f21, f22, f31, and f32 are different frequencies.

For example, as FIG. 7 shows, when using the "cell #11" as the camped cell, and when a predetermined condition A1 is satisfied, the cell selector unit 16 is configured to change the camped cell from the "cell #11" to the "cell #12".

Moreover, as FIG. 7 shows, when using the "cell #21" as the camped cell, and when the predetermined condition A1 is satisfied, the cell selector unit 16 is configured to change the camped cell from the "cell #21" to the "cell #22".

Moreover, as FIG. 7 shows, when using the "cell #31" as the camped cell, and when the predetermined condition A1 is satisfied, the cell selector unit 16 is configured to change the camped cell from the "cell #31" to the "cell #32".

Here, in a case where the "cell #12", the "cell #22" or the "cell #32" is a macro cell, the cell selector unit 16 is configured to determine that the predetermined condition A1 is satisfied, when the following Equation (2A) holds true, namely, when the radio quality in the "cell #12", the "cell #22" or the "cell #32" satisfies predetermined radio quality and when the radio quality in the "cell #11", the "cell #21" or the "cell #31" does not meet predetermined radio quality.

$$\text{"Neighbour"}+\text{"Offset 1"}>\text{"threshold 1"}, \text{ and "Serving"}+\text{"Offset 2"}<\text{"threshold 2"} \quad \text{Equation (2A)}$$

Here, "Neighbour" is the radio quality in a cell adjacent to the current camped cell of the mobile station UE (the "cell #12", the "cell #22" or the "cell #32"); and "Serving" is the radio quality in the current camped cell of the mobile station UE (the "cell #11", the "cell #21" or the "cell #31").

Meanwhile, in a case where the "cell #12", the "cell #22" or the "cell #32" is a CSG cell, the cell selector unit 16 is configured to determine that the predetermined condition A1 is satisfied, when the following Equation (3) holds true, namely, in addition to the conditions of the Equation (2A) described above being satisfied, when the difference between the radio quality in the "cell #12", the "cell #22" or the "cell #32" and the best radio quality among cells using any of the second frequencies f12, f22, and f32 is within a predetermined offset.

$$\text{"Neighbour"}+\text{"Offset 1"}>\text{"threshold 1"}, \text{ and "Serving"}+\text{"Offset 2"}<\text{"threshold 2"}, \text{ and } \text{"Neighbour"}>\text{"R0"}-\text{"Offset 3"} \quad \text{Equation (3)}$$

Here, "R0" is the radio quality in a cell having the best radio quality among cells using the same frequency as the frequency (f12, f22, or f32) used in a cell (the "cell #12", the "cell #22" or the "cell #32") adjacent to the current camped cell of the mobile station UE.

Furthermore, as FIG. 7 shows for example, when using the "cell #12" as the camped cell, and when a predetermined condition B1 is satisfied, the cell selector unit 16 is configured to change the camped cell from the "cell #12" to the "cell #22".

Moreover, when using the "cell #22" as the camped cell, and when the predetermined condition B1 is satisfied, the cell selector unit 16 is configured to change the camped cell from the "cell #22" to the "cell #32".

Here, the cell selector unit 16 is configured to determine that the predetermined condition B1 is satisfied, when the "cell #22" or the "cell #32" is a macro cell, and when the following Equation (4) holds true, namely, when the radio quality in the "cell #22" or the "cell #32" satisfies predetermined radio quality and when the radio quality in the "cell #12" or the "cell #22" does not meet predetermined radio quality.

$$\text{"Neighbour"}+\text{"Offset 4"}>\text{"threshold 3"}, \text{ and "Serving"}+\text{"Offset 5"}<\text{"threshold 4"} \quad \text{Equation (4)}$$

Here, "Neighbour" is the radio quality in a cell adjacent to the current camped cell of the mobile station UE (the "cell #22" or the "cell #32"); and "Serving" is the radio quality in the current camped cell of the mobile station UE (the "cell #12" or the "cell #22").

In addition, the cell selector unit 16 may be configured to determine that the predetermined condition B1 is satisfied, when the following Equation (4-1) holds true, in addition to the Equation (4) described above holding true. Specifically, the Equation (4-1) holds true, when there is no cell that satisfies the predetermined radio quality among the cells using the same frequency as the frequency (f12 or f22) used in the current camped cell (the "cell #12" or the "cell #22") of the mobile station UE.

$$\text{"X"}+\text{"Offset 5"}<\text{"threshold 4"} \quad \text{Equation (4-1)}$$

Here, "X" is the radio quality in each cell using the same frequency as the frequency (f12 or f22) used in the current camped cell (the "cell #12" or the "cell #22") of the mobile station UE.

On the other hand, the cell selector unit 16 is configured to determine that the predetermined condition B1 is satisfied, when the "cell #22" or the "cell #32" is a CSG cell, and when the following Equation (5) holds true, namely, in addition to the conditions of the Equation (4) described above being satisfied, when the difference between the radio quality in the "cell #22" or the "cell #32" and the best radio quality among cells using any of the second frequencies f22 and f32 is within a predetermined offset.

$$\text{"Neighbour"}+\text{"Offset 4"}>\text{"threshold 3"}, \text{ and "Serving"}+\text{"Offset 5"}<\text{"threshold 4"}, \text{ and } \text{"Neighbour"}>\text{"R0"}-\text{"Offset 6"} \quad \text{Equation (5)}$$

Here, "R0" is the radio quality in a cell having the best radio quality among cells using the same frequency as the frequency (f22 or f32) used in a cell adjacent to the current camped cell of the mobile station UE (the "cell #22" or the "cell #32").

In addition, the cell selector unit 16 may be configured to determine that the predetermined condition B1 is satisfied, when the following Equation (5-1) holds true, in addition to the Equation (5) described above holding true. Specifically, the Equation (5-1) holds true, when there is no cell that satisfies the predetermined radio quality among the cells using the same frequency as the frequency (f12 or f22) used in the current camped cell (the "cell #12" or the "cell #22") of the mobile station UE.

$$\text{"X"}+\text{"Offset 5"}<\text{"threshold 4"} \quad \text{Equation (5-1)}$$

Here, "X" is the radio quality in each cell using the same frequency as the frequency (f12 or f22) used in the current camped cell (the "cell #12" or the "cell #22") of the mobile station UE.

For example, as FIG. 7 shows, when using the "cell #31" as the camped cell, and when a predetermined condition C1 is satisfied, the cell selector unit 16 is configured to change the camped cell from the "cell #31" to the "cell #32".

Moreover, as FIG. 7 shows, when using the "cell #21" as the camped cell, and when the predetermined condition C1 is satisfied, the cell selector unit 16 is configured to change the camped cell from the "cell #21" to the "cell #11".

Here, in a case where the "cell #11" or the "cell #21" is a macro cell, the cell selector unit 16 is configured to determine that the predetermined condition C1 is satisfied, when the following Equation (6) holds true, namely, when the radio quality in the "cell #11" or the "cell #21" satisfies predetermined radio quality.

"Neighbour"+"Offset 7">"threshold 5"  Equation (6)

Here, "Neighbour" is the radio quality in a cell adjacent to the current camped cell of the mobile station UE (the "cell #11" or the "cell #21").

Meanwhile, in a case where the "cell #11" or the "cell #21" is a CSG cell, the cell selector unit 16 is configured to determine that the predetermined condition C1 is satisfied, when the following Equation (7) is satisfied, namely, in addition to the condition of the Equation (6) described above being satisfied, when the difference between the radio quality in the "cell #11" or the "cell #21" and the best radio quality among the cells using any of the second frequencies f11 and f21 is within a predetermined offset.

"Neighbour"+"Offset 7">"threshold 5", and

"Neighbour">"R0"−"Offset 8"  Equation (7)

Here, "R0" is the radio quality in a cell having the best radio quality among cells using the same frequency as the frequency (f11 or f21) used in a cell adjacent to the current camped cell of the mobile station UE (the "cell #11" or the "cell #21").

Note that the above-described operations of the mobile station UE, the radio base station eNB, the home base station HNB, and the switching apparatus MME may be implemented by any of hardware, a software module executed by a processor, and a combination of both.

The software module may be provided in a storage medium of any form, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can read from and write into the storage medium. Moreover, the storage medium may be integrated into the processor. Further, the storage medium and the processor may be provided in an ASIC. The ASIC may be provided in the mobile station UE and the radio base station eNB. Furthermore, the storage medium and the processor may be provided in the mobile station UE and the radio base station eNB as discrete components.

The present invention has been described in detail above using the embodiment above. It is apparent to those skilled in the art that the present invention is not limited to the embodiment described herein. The present invention may be carried out as modified or corrected forms without departing from the spirit and scope of the present invention defined by the appended claims. Therefore, the description of the present invention has been given for illustrative purposes only and is not intended to limit the present invention whatsoever.

Note that the entire content of Japanese Patent Application No. 2008-243401 (filed on Sep. 22, 2008) is incorporated herein by reference.

INDUSTRIAL APPLICABILITY

As described above, the present invention can provide a cell selection method and a mobile station that allow a camped cell to be properly selected in an environment where CSG cells and macro cells coexist.

The invention claimed is:

1. A cell selection method in which a mobile station selects a camped cell, wherein:
    a same priority level is assigned to cells using a same carrier frequency,
    adjacent cells use a same carrier frequency, and
    the method comprises:
    changing, at the mobile station, the camped cell from a first cell using a first carrier frequency to a second cell using a second carrier frequency which is different from the first carrier frequency, when the first cell is used as the camped cell, when a priority level of a cell using the second carrier frequency is the same as a priority level of a cell using the first carrier frequency, and when a sum of radio quality in the second cell and a predetermined offset is larger than a sum of radio quality in the first cell and a predetermined parameter.

2. The cell selection method according to claim 1, further comprising:
    changing, at the mobile station, the camped cell from the first cell to a third cell using a third carrier frequency which is different from the first carrier frequency, when the first cell is used as the camped cell, when a priority level of a cell using the third carrier frequency is lower than a priority level of a cell using the first carrier frequency, when radio quality in the third cell satisfies predetermined radio quality, and when radio quality in the first cell does not satisfy predetermined radio quality.

3. A mobile station configured to select a camped cell comprising:
    a cell selector unit configured to change the camped cell from a first cell using a first carrier frequency to a second cell using a second carrier frequency which is different from the first carrier frequency, when the mobile station uses the first cell as the camped cell, when a priority level of a cell using the second carrier frequency is the same as a priority level of a cell using the first carrier frequency, and when a sum of radio quality in the second cell and a predetermined offset is larger than a sum of radio quality in the first cell and a predetermined parameter.

4. The mobile station according to claim 3, wherein
    the cell selector unit is configured to change the camped cell from the first cell to a third cell using a third carrier frequency which is different from the first carrier frequency, when the first cell is used as the camped cell, when a priority level of a cell using the third carrier frequency is lower than a priority level of a cell using the first carrier frequency, when radio quality in the third cell satisfies predetermined radio quality, and when radio quality in the first cell does not satisfy predetermined radio quality.

* * * * *